(12) United States Patent
Cianciotto

(10) Patent No.: US 7,324,731 B2
(45) Date of Patent: Jan. 29, 2008

(54) SYSTEMS AND METHODS FOR DISTRIBUTING SIGNALS COMMUNICATED ON FIBER OPTIC TRANSMISSION LINES

(75) Inventor: Frank T. Cianciotto, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 11/199,826

(22) Filed: Aug. 9, 2005

(65) Prior Publication Data

US 2007/0036498 A1    Feb. 15, 2007

(51) Int. Cl.
G02B 6/04    (2006.01)

(52) U.S. Cl. ...................................... 385/115

(58) Field of Classification Search ................. 385/115
See application file for complete search history.

(56) References Cited

U.S. PATENT DOCUMENTS

| | | | | |
|---|---|---|---|---|
| 3,883,223 A | * | 5/1975 | Hudson | 385/24 |
| 4,143,941 A | * | 3/1979 | Soref | 385/18 |
| 4,329,017 A | * | 5/1982 | Kapany et al. | 385/22 |
| 4,362,358 A | * | 12/1982 | Hafle | 385/24 |
| 4,479,697 A | * | 10/1984 | Kapany et al. | 385/33 |
| 4,484,793 A | * | 11/1984 | Laude | 385/22 |
| 4,632,513 A | | 12/1986 | Stowe et al. | |
| 4,964,692 A | | 10/1990 | Prescott | |
| 5,054,874 A | | 10/1991 | Hill et al. | |
| 5,133,030 A | * | 7/1992 | Lee | 385/19 |
| 5,226,104 A | * | 7/1993 | Unterleitner et al. | 385/140 |
| 5,375,185 A | | 12/1994 | Hermsen et al. | |
| 5,553,183 A | | 9/1996 | Bechamps | |
| 5,604,837 A | | 2/1997 | Tanaka | |
| 5,701,191 A | | 12/1997 | Iwasaki | |
| 5,828,505 A | | 10/1998 | Farmiga | |
| 6,038,361 A | | 3/2000 | Yoshikawa et al. | |
| 6,104,857 A | | 8/2000 | Ishiharada et al. | |
| 6,149,289 A | | 11/2000 | Kuramitsu et al. | |
| 6,324,330 B1 | | 11/2001 | Stites | |

(Continued)

FOREIGN PATENT DOCUMENTS

EP    0162627 A2    11/1985

(Continued)

OTHER PUBLICATIONS

PCT Intl Search Report and Written Opinion for Application No. PCT/US2006/029172, dated Dec. 14, 2006, 12 pages.

*Primary Examiner*—Frank G. Font
*Assistant Examiner*—Mary El-Shammaa
(74) *Attorney, Agent, or Firm*—Lee & Hayes, PLLC

(57) ABSTRACT

Methods and systems for distributing signals communicated on fiber optic transmission lines are disclosed. In one embodiment, a fiber optic communications system includes a transmitter operable to transmit an optical signal, and at least one receiver operable to receive an optical signal. A fiber optic splitter assembly includes a first optic fiber coupled to the transmitter and one or more second optic fibers adjacent to the first optic fiber and coupled to the one or more receivers. The respective terminal ends of the first optic fiber and the one or more second optic fibers are spaced apart from a concave optical reflector that is operable to receive optical signals from the first optical fiber and to reflect the optical signals towards the one or more second optic fibers.

24 Claims, 4 Drawing Sheets

U.S. PATENT DOCUMENTS

| | | |
|---|---|---|
| 6,332,688 B1 | 12/2001 | Magarill |
| 6,366,308 B1 | 4/2002 | Hawryluk et al. |
| 6,595,673 B1 | 7/2003 | Ferrante et al. |
| 6,771,870 B2 | 8/2004 | Strobl et al. |
| 6,792,190 B2 | 9/2004 | Xin et al. |
| 6,801,701 B1 | 10/2004 | Montgomery et al. |
| 6,857,764 B2 | 2/2005 | Kohno |
| 6,985,658 B2 * | 1/2006 | Smaglinski .................. 385/47 |
| 2001/0005222 A1 | 6/2001 | Yamaguchi |
| 2004/0137089 A1 | 7/2004 | Dinan |
| 2004/0137189 A1 | 7/2004 | Tellini et al. |
| 2005/0084210 A1 | 4/2005 | Cha |
| 2005/0135766 A1 | 6/2005 | Cianciotto et al. |
| 2005/0162853 A1 | 7/2005 | Jain |
| 2005/0265683 A1 | 12/2005 | Cianciotto et al. |

FOREIGN PATENT DOCUMENTS

| | | |
|---|---|---|
| FR | 2580411 A1 | 10/1986 |
| JP | 11017969 | 1/1999 |
| JP | 11250227 | 9/1999 |

* cited by examiner

SYSTEMS AND METHODS FOR DISTRIBUTING SIGNALS COMMUNICATED ON FIBER OPTIC TRANSMISSION LINES

CROSS REFERENCE TO RELATED APPLICATIONS

This patent application is related to co-pending, commonly-owned U.S. patent application Ser. No. 11/154,079 entitled "Hextube Light Homogenizer Splitter" filed on Jun. 15, 2005, U.S. patent application Ser. No. 11,371,878 entitled "Hextube Light Homogenizer Splitter" filed on Mar. 8, 2006, and U.S. patent application Ser. No. 11/180,285 entitled "Tri-To-Hex Light Mixing and Homogenizing Apparatus and Method" filed on Jul. 12, 2005 and U.S. patent application Ser. No. 11/122,205 entitled "Light Mixing and Homogenizing Apparatus and Method" filed on May 3, 2005.

FIELD OF THE INVENTION

This invention relates generally to fiber optic devices, and, more specifically, to systems and methods for splitting signals communicated on fiber optic transmission lines.

BACKGROUND OF THE INVENTION

Fiber-optic transmission lines are often used to communicate signals in electronic systems due to the generally higher noise immunity, greater signal bandwidth, and lower signal attenuation properties obtainable in such lines. Fiber-optic transmission lines are also generally thinner and lighter than metallic conductors of comparable capacity. Accordingly, fiber optic transmission lines are widely used in telecommunications, as well as in other related areas.

In selected fiber optic systems, it is desirable to permit a single fiber optic input line to be coupled to a plurality of fiber optic output lines, so that a signal transmitted on the fiber optic input line may be simultaneously accessed by fiber optic devices coupled to each of the fiber optic output lines. For example, in local area network (LAN) systems using a star network topology or a bus topology, optical signals must be subdivided and communicated from a main computer to a plurality of computer nodes. Accordingly, fiber optic splitters that are configured to divide an input signal into a plurality of output signals are available to provide the output signals to each of the nodes.

In one known fiber optic splitter, coupling between the fiber optic input line and the plurality of fiber optic output lines is formed by intertwining end portions of the fiber optic output lines around an end portion of the fiber optic input fiber, and thermally fusing the respective end portions together to form a signal mixing region. Although the foregoing fabrication method is relatively simple to implement, considerable difficulty may be encountered in fabricating fiber optic splitters having a consistent level of performance. For example, since the length of the signal mixing region depends upon the amount of twisting and pulling of the fibers that occurs during the thermal fusion process, considerable variation may be introduced into the splitter during fabrication, which may result in high scrap rates, and thus increase the overall cost per unit for the splitter.

There is therefore a need for fiber optic systems and methods that overcome the disadvantages of prior art systems. In particular, there is a need for a fiber optic splitter that avoids the shortcomings of prior art fiber optic splitters.

SUMMARY

The present invention comprises methods and systems for distributing signals communicated on fiber optic transmission lines. In one aspect, a fiber optic communications system includes a transmitter operable to transmit an optical signal, and at least one receiver operable to receive an optical signal. A fiber optic splitter assembly includes a first optic fiber coupled to the transmitter and one or more second optic fibers adjacent to the first optic fiber and coupled to the one or more receivers. The respective terminal ends of the first optic fiber and the one or more second optic fibers are spaced apart from a concave optical reflector that is operable to receive optical signals from the first optical fiber and to reflect the optical signals towards the one or more second optic fibers.

BRIEF DESCRIPTION OF THE DRAWINGS

Embodiments of the present invention are described in detail below with reference to the following drawings.

DETAILED DESCRIPTION

The present invention relates to systems and methods for distributing signals communicated on fiber optic transmission lines. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without one or more of the details described in the following description.

Figure 1:
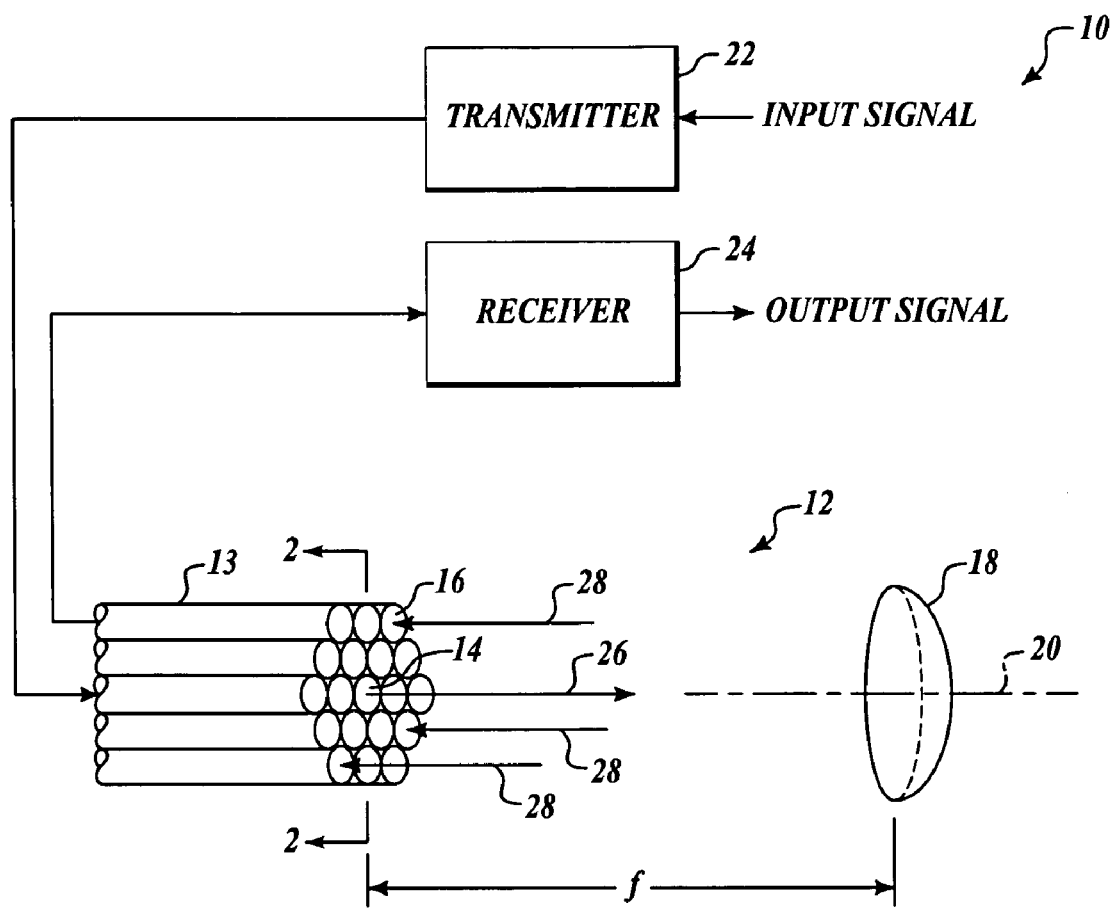
FIG. 1 is a partial isometric view of a fiber optic communications system according to an embodiment of the invention.

FIG. 1 is a partial isometric view of a fiber optic communications system 10 according to an embodiment of the invention. The system 10 includes a fiber optic splitter assembly 12 having a fiber optic bundle 13 that includes centrally disposed transmission fiber 14, and one or more receiving fibers 16 that are positioned proximate to the transmission fiber 14. The transmission fiber 14 and the one or more receiving fibers 16 may include optical fibers having a silica-glass core material, or they may include optical fibers formed from a polymeric core material, or any other suitable materials. In either case, the transmission fiber 14 and the one or more receiving fibers 16 may be suitably cladded to promote internal reflectivity of the fibers and to minimize "cross-talk" effects within the fiber optic bundle 13.

The fiber optic splitter assembly 12 also includes a concave optical reflector 18 that is spaced apart from respective terminal ends of the transmission fiber 14 and the one or more receiving fibers 16 by a predetermined distance f, which may be a focal point distance of the reflector 18. The reflector 18 is generally positioned along an optical axis 20 that extends along an axis of the transmission fiber 14. In one specific embodiment, the optical axis 20 is the axis of symmetry of the fiber optic bundle 13.

The system 10 further includes a transmitter 22 that is operably coupled to the transmission fiber 14. The transmitter 22 may be configured to receive an input signal and modulate the input signal to generate an output signal, including, for example, an amplitude-modulated (AM) waveform, a frequency-modulated (FM) waveform, or a digital pulse code-modulated (PCM) signal. The transmitter 22 further includes a light emission source operable to generate optical signals from the modulated signals for output to the transmission fiber 14. Accordingly, the light emission source may include a light emitting diode (LED). Suitable LED's may include, for example, those LED's that generate optical output signals at wavelengths of approximately about 850 nanometers (nm), 1310 nm and 1550 nm, depending on the material composition of the LED selected. Alternately, the light emission source may include a laser diode that typically generates optical output signals at wavelengths of approximately about 1310 nm, 1550 nm and 1625 nm, depending on the configuration of the particular laser diode selected. Still other suitable light emission sources are available that may be used to generate the optical signals. In addition, suitable alternate embodiments of light emission sources are available that are emissive in other portions of the optical spectrum, and which may provide broadband or monochromatic optical signals.

The system 10 also includes one or more receivers 24 that are operably coupled to the receiving fibers 16. The receivers 24 are operable to detect optical signals received from the transmitter 22, and to demodulate the optical signals. The optical signals may be detected using optical devices such as a p-type intrinsic n-type (PIN) diode, or an avalanche photodiode, although other suitable optical detection devices exist. The demodulated optical signals may then be converted to suitable output signals. Although the foregoing description of the system 10 includes a transmitter 22 and a receiver 24 that are operable to transmit and receive optical signals having an informational content, other configurations are possible. For example, in one specific embodiment, the optical signal generated by the transmitter 22 is a non-modulated signal operable to provide optical energy to a selected component at a desired intensity. The corresponding receiver 24 may then be positioned on the selected component, and may distribute the optical energy to provide a desired level of illumination to the selected component. For example, the transmitter 22 may include the light emission source, such as an LED, a laser diode, or other suitable devices, while the receiver 24 includes a light diffuser, a lens, or other suitable light distribution devices. Accordingly, the system 10 may be used to transfer optical energy from the light emission source and to distribute the optical energy to an instrument panel, a floor illumination system, or other similar illumination systems.

Still referring to FIG. 1, the operation of the system 10 will now be described. Modulated or unmodulated optical energy is generated by the transmitter 22 and communicated to the transmission fiber 14. The optical energy projects a transmitted optical signal (e.g. a pulse, a beam, etc.) 26 from a terminal end of the transmission fiber 14 and into the concave optical reflector 18. The concave optical reflector 18 reflects the transmitted optical signal 26 so that a family of reflected optical signals 28 is directed towards the receiving fibers 16. The reflected optical signals 28 are then communicated along the receiving fibers 16 to the receivers 24. Since the family of reflected optical signals 28 may uniformly illuminate the receiving fibers 16, each of the receiving fibers 16 may receive an approximately equal portion of the optical energy reflected by the concave optical reflector 18. In one particular embodiment, the optical reflector 18 is adapted to provide approximately uniform, approximately collimated reflected signals 28.

Figure 2:
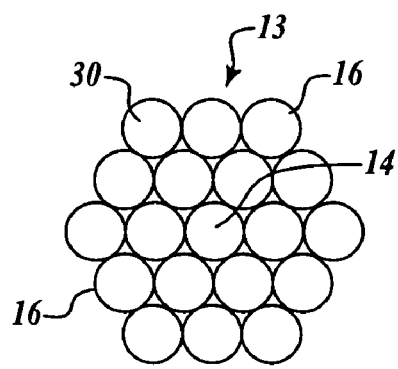
FIG. 2 is a plan view of the fiber optic bundle of the fiber optic splitter assembly viewed along the axis 2-2 of FIG. 1.

FIG. 2 is a plan view of the fiber optic bundle 13 of the fiber optic splitter assembly 12 viewed along the axis 2-2 of FIG. 1. The transmission fiber 14 and the receiving fibers 16 may be arranged in a hexagonal close-packed configuration so that the respective optical fibers 14 and 16 of the assembly 12 form a relatively dense array of optical fibers. Alternately, the transmission fiber 14 and the receiving fibers 16 may be configured in other arrangements, such as a rectangular close-packed array, or any other desired arrangements. The face portions 30 of the optical fibers 14 and 16 may be suitably treated to enhance the transfer of optical energy from the transmission fiber 14 to the receiving fibers 16 by means of the reflector 18. For example, the face portions 30 may be optically polished to minimize losses incurred through optical refractions, or other optical aberrations.

Figure 3:
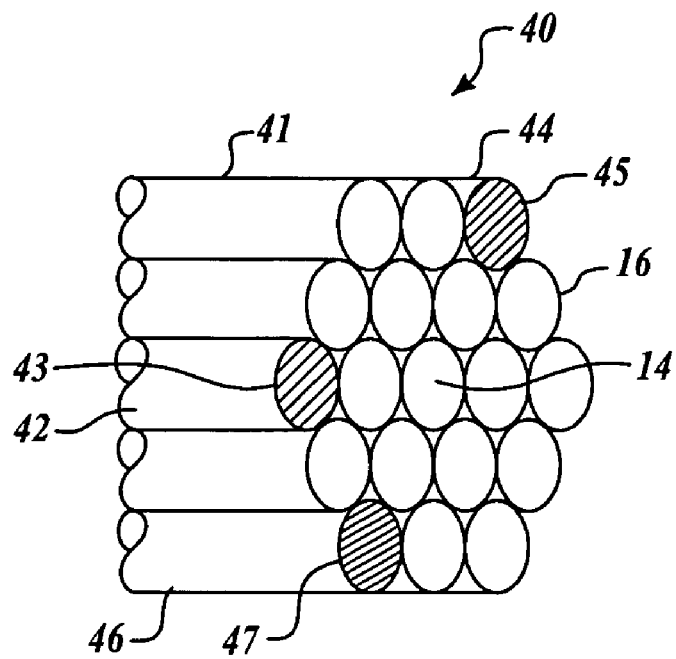
FIG. 3 is a partial isometric view of a fiber optic splitter assembly according to another embodiment of the invention.

FIG. 3 is a partial isometric view of a fiber optic splitter assembly 40 according to another embodiment of the invention. The assembly 40 includes fiber optic bundle 41 that includes a centrally-disposed transmission fiber 14 that projects optical energy outwardly and towards the concave optical reflector 18 (as shown in FIG. 1). One or more receiving fibers are positioned proximate to the transmission fiber 14, which may include the receiving fibers 16, as previously described. Other receiving fibers within the bundle 41 may be configured to provide a desired degree of optical signal attenuation. For example, a first receiving fiber 42 is configured with a first optical signal attenuator 43, while a second receiving fiber 44 is configured with a second optical signal attenuator 45 that provides greater signal attenuation than the first optical signal attenuator 43. Further, a third receiving fiber 46 may be configured with a third optical signal attenuator 47 that provides even greater signal attenuation than the first optical signal attenuator 43 and the second optical signal attenuator 45. In one particular embodiment, the first, second and third optical signal attenuators 43, 45, and 47 may be formed by selectively treating the terminal ends of the first, second and third receiving fibers 42, 44 and 46 with optical attenuation coatings to achieve a desired degree of optical signal attenuation. Alternately, optical signal attenuators 43, 45, and 47 may be removably coupled to the terminal ends of the receiving fibers 42, 44 and 46. Although FIG. 3 shows three optical fibers receiving first, second and third optical signal attenuators 43, 45, and 47, it is understood that fewer than three, or more than three receiving fibers may be configured with optical signal attenuators.

Figure 4:
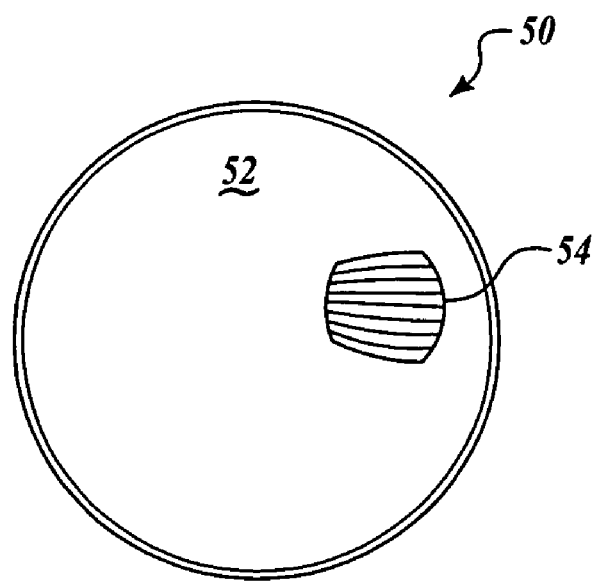
FIG. 4 is a plan view of a concave optical reflector that may be used with the fiber optic splitter assembly of FIG. 1, according to another embodiment of the invention.

FIG. 4 is a plan view of a concave optical reflector 50 that may be used with the fiber optic splitter assembly 12 of FIG. 1, according to another embodiment of the invention. The concave optical reflector 50 includes a first reflective portion 52 that provides a first optical reflectivity, and a second reflective portion 54 that provides a second optical reflectivity that is less than the first optical reflectivity. The second reflective portion 54 is suitably positioned on the reflector 50 to reflect generally less optical energy to selected receiving fibers 16 (as shown in FIG. 1). Accordingly, the reflected signals 28 (also shown in FIG. 1) that are directed from the second reflective portion 54 and towards the selected receiving fibers 16 generally illuminate the receiving fibers 16 at a reduced level in comparison to the illumination received by fibers 16 that receive reflected signals from the first reflective portion 52. Although a single reflective portion 54 is shown in FIG. 4, it is understood that additional reflective portions having different reflectivities may also be positioned on the concave optical reflector 50.

Figure 5:
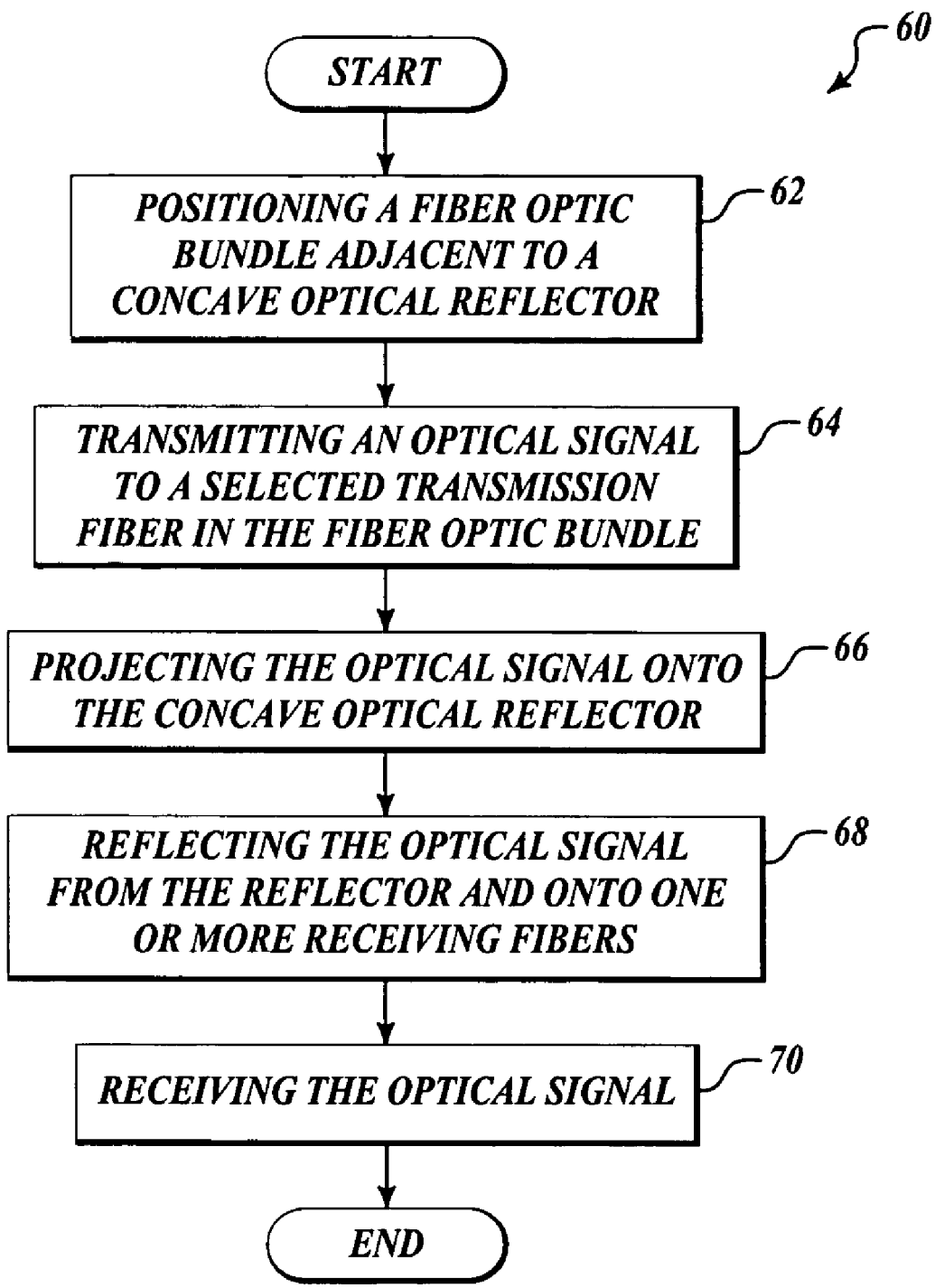
FIG. 5 is a flowchart that describes a method of distributing optical signals communicated on fiber optic transmission lines, according to still another embodiment of the invention.

FIG. 5 is a flowchart that will be used to describe a method 60 of distributing optical signals communicated on fiber optic transmission lines, according to still another embodiment of the invention. At block 62, a fiber optic bundle is positioned adjacent to a concave optical reflector. The concave optical reflector is generally positioned along an axis of symmetry of a transmitting fiber within the fiber optic bundle (which may coincide with an axis of symmetry of the fiber optic bundle itself), and is spaced apart from face portions of the optical fibers by a predetermined distance. At block 64, an optical signal is transmitted to a selected transmission fiber in the fiber optic bundle. The optical signal may be a modulated optical signal, or it may be an unmodulated optical signal, as previously discussed. In a particular embodiment, the selected transmission fiber is a centrally-disposed fiber in the fiber optic bundle. At block 66, the optical signal is projected onto the concave optical reflector. At block 68, the optical signal is reflected from the reflector so that one or more receiving fibers in the fiber optic bundle is illuminated by the reflected optical energy. Accordingly, the optical signal is distributed to the one or more receiving fibers. At block 70, the distributed optical signals are communicated to a receiver. If the optical signal is modulated, the optical signal may is suitably detected and demodulated by the receiver.

Figure 6:
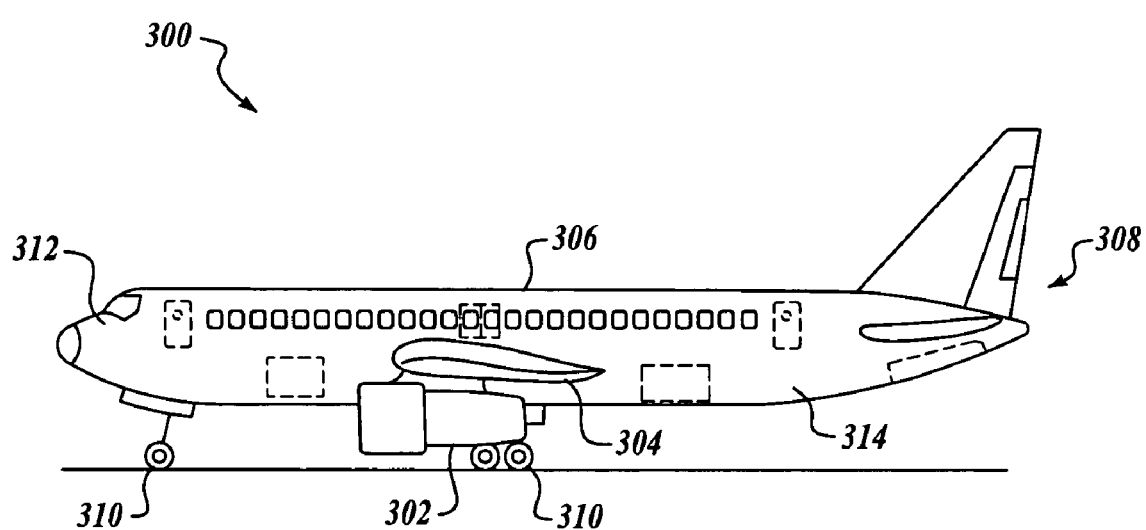
FIG. 6 is a side elevation view of an aircraft having one or more of the disclosed embodiments of the present invention.

Embodiments of methods and apparatus in accordance with the invention may be incorporated into a wide variety of different systems. Referring now in particular to FIG. 6, a side elevation view of an aircraft 300 having one or more of the disclosed embodiments of the present invention is shown. The aircraft 300 generally includes a variety of components and subsystems known in the pertinent art, which in the interest of brevity, will not be described in detail. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306, and a flight control system 312 (not shown in FIG. 6), as well as a plurality of other electrical, mechanical and electromechanical systems that cooperatively perform a variety of tasks necessary for the operation of the aircraft 300.

With reference still to FIG. 6, the aircraft 300 may include one or more of the embodiments of the optical signal distribution system 314 according to the present invention, which may be incorporated into various portions of the aircraft 300. For example, the various disclosed embodiments may be used in the flight control system 314, aircraft monitoring systems, illumination systems, or any other desired portions of the aircraft 300.

The aircraft 300 is generally representative of a commercial passenger aircraft, which may include, for example, the 737, 747, 757, 767 and 777 commercial passenger aircraft available from The Boeing Company of Chicago, Ill. In alternate embodiments, the present invention may also be incorporated into flight vehicles of other types. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A fiber optic communications system, comprising:
a transmitter operable to transmit an optical signal;
at least one receiver operable to receive an optical signal; and
a fiber optic splitter assembly including a concave optical reflector and a fiber optic bundle, the fiber optic bundle including a first optic fiber coupled to the transmitter and a plurality of second optic fibers proximate to the first optic fiber and coupled to at least one receiver, wherein respective terminal ends of the first optic fiber and the plurality of second optic fibers are spaced apart from the concave optical reflector, the concave optical reflector being operable to receive optical signals from the first optical fiber and to reflect the optical signals towards the plurality of second optic fibers,
wherein a first portion of the plurality of second optic fibers have an attenuator coupled to each of their respective terminal ends and a second portion of the plurality of second optic fibers remain non-attenuated at their respective terminal ends.

2. The system of claim 1, wherein the attenuator coupled to each of the terminal ends of the first portion includes an optical attenuation coating.

3. The system of claim 1, wherein the fiber optic bundle has an axis of symmetry, and wherein the terminal end of the first optic fiber is disposed approximately along the axis of symmetry.

4. The system of claim 3, wherein the fiber optic bundle further comprises a hexagonal close-packed configuration of the first optic fiber and the plurality of second optic fibers.

5. The system of claim 1, wherein at least one optic signal attenuator including a first attenuation level and a second attenuator including a second attenuation level that differs from the first attenuation level.

6. The system of claim 1, wherein the concave optical reflector further comprises a first reflective portion having a first optical reflectivity, and a second reflective portion having a second optical reflectivity, the first optical reflectivity being different from the second optical reflectivity.

7. The system of claim 1, wherein the transmitter is operable to generate a modulated optical signal, and the receiver is configured to demodulate the modulated optical signal.

8. A method of distributing optical signals communicated on fiber optic transmission lines, comprising:
positioning a fiber optic bundle adjacent to a concave optical reflector, the fiber optic bundle comprising a first optic fiber and a plurality of second optic fibers, wherein a first portion of the plurality of second optic fibers have attenuators coupled to terminal ends thereof, and a second portion of the plurality of second optic fibers remain non-attenuated;

transmitting an optical signal to the first optic fiber in the fiber optic bundle;

projecting the optical signal onto the concave optical reflector; and reflecting the optical signal from the concave optical reflector and onto the attenuated terminal ends of the plurality of second optic fibers.

9. The method of claim 8, wherein positioning a fiber optic bundle adjacent to a concave optical reflector further comprises spacing the concave optical reflector at a focal distance relative to a terminal end of the fiber optic bundle.

10. The method of claim 8, wherein transmitting an optical signal to the first optic fiber further comprises communicating a modulated optical signal to the first optic fiber.

11. The method of claim 10, wherein communicating a modulated optical signal to the first optic fiber further comprises communicating one of an amplitude-modulated (AM) waveform, a frequency-modulated (FM) waveform and a digital pulse code-modulated (PCM) waveform.

12. The method of claim 10, wherein communicating a modulated optical signal to the first optic fiber further comprises demodulating the modulated optical signal using a suitably configured receiver.

13. The method of claim 8, wherein projecting the optical signal onto the concave optical reflector further comprises projecting a first portion of the optical signal onto a first reflecting portion having a first reflectivity, and projecting a second portion of the optical signal onto a second reflecting portion having a second reflectivity, wherein the first reflectivity differs from the second reflectivity.

14. The method of claim 8, further comprising at least one optic signal attenuator from the plurality of second optic fibers having a first attenuation level and a second attenuator having a second attenuation level that differs from the first attenuation level.

15. The method of claim 8, wherein positioning a fiber optic bundle adjacent to a concave optical reflector further comprises positioning a fiber optic bundle having a hexagonal shaped close-packed arrangement of fibers adjacent to the concave optical reflector.

16. An aerospace vehicle, comprising:
a fuselage;
wing assemblies and an empennage operatively coupled to the fuselage; and
a fiber optic communications system positioned in at least one of the fuselage, the wing assemblies and the empennage, the system further comprising:
a transmitter operable to transmit an optical signal;
at least one receiver operable to receive an optical signal;
a fiber optic splitter assembly including a concave optical reflector and a fiber optic bundle, the fiber optic bundle including a first optic fiber coupled to the transmitter and a plurality of second optic fibers proximate to the first optic fiber and coupled to at least one receiver, wherein respective terminal ends of the first optic fiber and the plurality of second optic fibers are spaced apart from the concave optical reflector, the concave optical reflector being operable to receive optical signals from the first optical fiber and to reflect the optical signals towards the plurality of second optic fibers, wherein the fiber optic bundle is arranged in a hexagonal closely-packed configuration.

17. The aerospace vehicle of claim 16, wherein at least one of the plurality of second optic fibers includes a first attenuator coupled to a terminal end thereof and having a first attenuation level.

18. The aerospace vehicle of claim 17, wherein at least one of the plurality of second optic fibers includes a second attenuator coupled to a terminal end thereof and having a second attenuation level that differs from the first attenuation level.

19. The aerospace vehicle of claim 16, wherein the concave optical reflector further comprises a first reflective portion having a first optical reflectivity, and a second reflective portion having a second optical reflectivity, the first optical reflectivity being different from the second optical reflectivity.

20. A fiber optic splitter assembly, comprising:
an optical reflector; and
a fiber optic bundle including a transmitting optic fiber and a plurality of receiving optic fibers proximate to the transmitting optic fiber, wherein respective terminal ends of the transmitting optic fiber and the plurality of receiving optic fibers are approximately aligned and operatively positioned relative to the optical reflector such that a transmitted optical signal from the transmitting optic fiber is reflected from the optical reflector to the plurality of receiving optic fibers, wherein at least some of the plurality of receiving optic fibers have an attenuator coupled to each respective terminal end thereof.

21. The assembly of claim 20, wherein each of the receiving optic fibers includes a receiving terminal end, and wherein the transmitting optic fiber includes a transmitting terminal end, and wherein the receiving and transmitting terminal ends are approximately co-planar.

22. The assembly of claim 20, wherein the fiber optic bundle comprising of a hexagonal closely-packed configuration that has an axis of symmetry, and wherein the terminal end of the transmitting optic fiber is disposed approximately along the axis of symmetry.

23. The assembly of claim 20, wherein the optical reflector is a concave optical reflector.

24. The assembly of claim 20, wherein the concave optical reflector further comprises a first reflective portion having a first optical reflectivity, and a second reflective portion having a second optical reflectivity, the first optical reflectivity being different from the second optical reflectivity.

* * * * *